US009924574B1

(12) United States Patent
Fernandez et al.

(10) Patent No.: US 9,924,574 B1
(45) Date of Patent: Mar. 20, 2018

(54) METHOD AND APPARATUS FOR CONTROLLING LIGHT OUTPUT FROM A LED LAMP

(71) Applicant: ULEDO LLC, Bonita Springs, FL (US)

(72) Inventors: Jose M. Fernandez, Sunrise, FL (US); Gary K. Mart, Coral Springs, FL (US)

(73) Assignee: ULEDO LLC., Bonita Springs, FL (US)

( * ) Notice: Subject to any disclaimer, the term of this patent is extended or adjusted under 35 U.S.C. 154(b) by 0 days.

(21) Appl. No.: 15/337,440

(22) Filed: Oct. 28, 2016

(51) Int. Cl.
H05B 37/02 (2006.01)
H05B 33/08 (2006.01)

(52) U.S. Cl.
CPC ..... *H05B 33/0845* (2013.01); *H05B 33/0812* (2013.01); *H05B 33/0827* (2013.01); *H05B 37/0272* (2013.01)

(58) Field of Classification Search
CPC ............ H05B 33/0845; H05B 33/0812; H05B 33/0827; H05B 37/0272
USPC ...................................... 315/185 R
See application file for complete search history.

(56) References Cited

U.S. PATENT DOCUMENTS

| 8,319,433 | B2 | 11/2012 | Lin et al. |
| 8,487,545 | B2 | 7/2013 | Bhagat |
| 8,569,956 | B2 | 10/2013 | Shteynberg et al. |
| 8,669,715 | B2 | 3/2014 | Riesebosch |
| 8,710,754 | B2 | 4/2014 | Baddela et al. |
| 2009/0224695 | A1* | 9/2009 | Van Erp ............. H05B 33/0848 315/302 |
| 2010/0045194 | A1* | 2/2010 | Peker ................. H05B 33/0827 315/185 R |
| 2010/0213850 | A1* | 8/2010 | Nerone ............. H05B 41/3925 315/105 |
| 2011/0204801 | A1 | 8/2011 | Smith et al. |
| 2012/0081009 | A1* | 4/2012 | Shteynberg .......... H05B 33/083 315/122 |
| 2014/0097762 | A1* | 4/2014 | Ide ..................... H05B 33/0806 315/192 |
| 2014/0125246 | A1* | 5/2014 | Sasaki ................ H05B 33/0803 315/224 |
| 2014/0231168 | A1* | 8/2014 | Dueck .................. F41A 21/325 181/223 |
| 2015/0115809 | A1* | 4/2015 | Siessegger ......... H05B 33/0803 315/185 R |
| 2016/0066386 | A1* | 3/2016 | Catalano ............ H05B 33/0854 315/309 |
| 2016/0239030 | A1* | 8/2016 | Hsu ........................ G05F 1/575 |

(Continued)

OTHER PUBLICATIONS

By Richard Comerford; LED Driver Update: The latest ICs and Modules; Digi-Key Electronics; pp. 1-4; www.digikey.com/en/articles/techzone/2013/mar/led-driver-update.

(Continued)

*Primary Examiner* — Don Le
(74) *Attorney, Agent, or Firm* — Patents on Demand P.A.; Brian K. Buchheit

(57) ABSTRACT

An LED lamp is powered by an external current regulated (constant current) power supply. The LED lamp provides a signal to the power supply to adjust the output current of the power supply to achieve and maintain a desired light output level. The signal is adjusted as the temperature of the LED lamp changes in order to ensure consistent light output of the LED lamp as the LED lamp changes temperature during operation.

20 Claims, 5 Drawing Sheets

(56) References Cited

U.S. PATENT DOCUMENTS

2016/0330805 A1* 11/2016 Briggs ............... H05B 33/0818
2016/0330806 A1* 11/2016 Yamashita ......... H05B 33/0818
2016/0330808 A1* 11/2016 Brandt ............... H05B 33/0845

OTHER PUBLICATIONS

Uledo (A Light Emitting Diode (LED) Lighting System); Patentability Search Report; p. 1-41.

* cited by examiner

METHOD AND APPARATUS FOR CONTROLLING LIGHT OUTPUT FROM A LED LAMP

FIELD OF THE DISCLOSURE

The present disclosure relates generally to lighting control systems, and more particularly to LED lamp devices with variable light output.

BACKGROUND

Lighting solutions using light emitting diodes (LEDs) are gaining in popularity because of the low power consumption required to produce a given level of light output, their efficacy, compared to other lighting technologies. LEDs, being diode, require a certain amount of forward voltage before they begin to conduct current. Once the junction is biased to allow current to flow through the LED, changing the current through the LED changes the light output of the LED. Accordingly, it is common to drive an LED lamp using a constant current driver that outputs a constant, or maximum direct current (DC) level.

One of the issues that has arisen with LED lamps is that as an LED changes temperature, then the semiconductor properties also change, which can cause changes in light output, such as total lumen and chromaticity. In general, as the junction temperature increases, light output level decreases at a given drive current. This results in the light output of a LED lamp being brighter when it is initially turned on, and decreasing during operation as the junction temperatures of the LEDs increase. The change in light output may be perceived by people, particularly if different LED lamps are turned on at different times near each other.

Another issue is that LED lamps are typically powered by voltage regulated power supplies. However, the forward operating voltage of LEDs can vary depending on the manufacturing process. As a result, the forward operating voltage of LEDs in a given LED lamp can vary substantially. Therefore, either the voltage regulated power supply must supply enough voltage to ensure that the LED lamp will have enough voltage for a worst case condition where all the LEDs have a high forward operating voltage, or the LEDs must be sorted to ensure they all have the same or similar forward operating voltage. Having excess overhead voltage is inefficient, and testing and sorting LEDs by forward operating voltage adds expense to the cost of manufacturing the LED lamp.

Accordingly, there is a need for a method and apparatus for maintaining the light output of a LED lamp constant over temperature.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
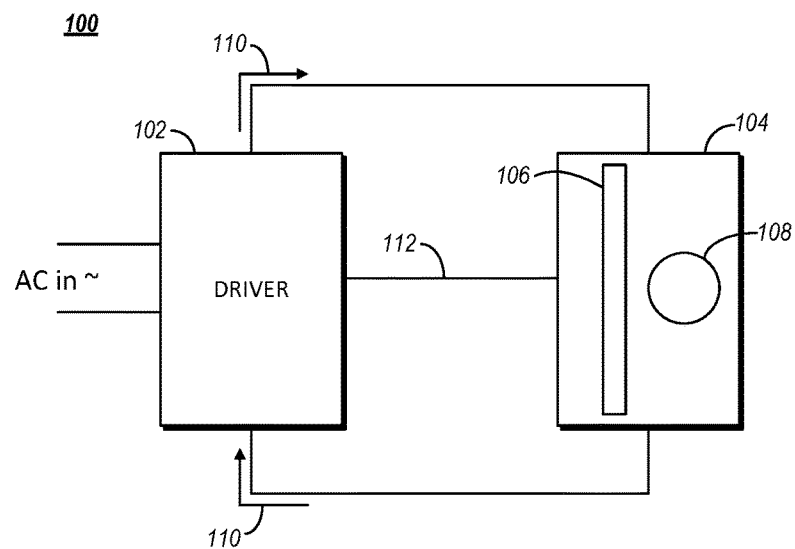
FIG. 1 is a block diagram of LED lighting system, in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Embodiments of the disclosure include a method for operating a light emitting diode (LED) lamp that includes providing a plurality of LEDs connected in series between a positive terminal and a negative terminal that provide a light output level based on a direct current through the plurality of LEDs. The method can further include receiving an input signal at a controller of the LED lamp, and providing, by the controller, an output signal to a constant current driver that is independent of the LED lamp and which provides current to the LED lamp to power the plurality of LEDs to a light output level corresponding to the input signal. The output signal to the constant current driver is based at least in part on the input signal to the controller.

Other embodiments of the disclosure can include a light emitting diode (LED) lamp that self regulates its light output to ensure a consistent light output level while operating, and includes a plurality of LEDs connected electrically in series (e.g. an LED string) operable to produce a light output level that is dependent on a level of current through the plurality of LEDs. The LED lamp can further include an input signal source providing an input signal corresponding to one of a user input or a condition of the LED lamp. The LED lamp can still further include a controller operable to receive the input signal and output a current control signal to a constant current driver that is external to the LED lamp and which provides the level of current to the LED lamp based in part on a level of the current control signal. The controller is further operable to vary the level of the current control signal based on the input signal to maintain the light output level.

FIG. 1 is a block diagram of LED lighting system 100, in accordance with some embodiments. A constant current driver 102 is an electric power supply that provides a steady state DC output current 110, and is powered by a commercial AC source (AC in). The DC current is provided to a lighting fixture 104 that holds an LED lamp 106 or 108. The fixture 104 can be designed to accommodate different LED lamp forms, including a tubular lamp 106, which resembles tubular fluorescent lamps, or screw-in type lamps having standardized shapes such as A, PS, B, C, CA, RP, S, F, R, BR, G, T, BT, E, ED, PAR, and so on, or any other form factor. The LED lamp 106, 108 includes a plurality of LEDs through which the current 110 passes, producing light. Accordingly, the voltage output of the constant current driver will vary to whatever level is necessary to cause current 110 to flow. The current 110 can be adjusted up to a maximum current output of the constant current driver 102. The adjustment of current 110 is accomplished by a dimming signal on line 112. The dimming signal can indicate an output current level based on a DC level or a pulse width of a pulse width modulation (PWM) signal. Ordinarily the dimming signal is provided by a rheostat or other device independent of any lamp that allows a user to adjust the current 110 to change the light output of the lamp 106, 108. The lamps 106, 108 have no internal power supply, and depend on the voltage and current provided by the constant current driver 102 that is external to the lamp 106, 108.

Instead of a user adjusting the current 110 output by the constant current driver 102, the lamp 106, 108 includes circuitry to provide a control signal on line 112 in response to the temperature of the LEDs in the lamp, as well as other factors such as user preference for light output level and age of the LEDs. In order the maintain the light output of the lamp 106 or 108 at a consistent level during operation, the current 110 needs to be adjusted as the LEDs change temperature. Rather than have an on-board power supply included in the lamp 106 or 108, however, the lamp 106 or 108 simply provides a dimming control signal to the constant current driver 102 to adjust the current 110. This arrangement avoids problems associated with integrating a power supply in the lamp 106 or 108 such as increased cost, weight, reliability, and so on.

In general, the lamp 106 or 108 can include logic, such as microcontroller, or other circuitry that receives information about the temperature of the LEDs in the lamp 106 or 108, such as a temperature signal from a thermal sensing circuit, and adjusts the signal on line 112 in accordance with known properties of the LEDs' light output over temperature. This adjustment can be considered to be a fine adjustment. The circuitry in the lamp 106 or 108 can further apply fine adjustment for age of the LEDs since LEDs properties change over the life of an LED as well. Coarser adjustment can be accomplished for changing the light output level to a user-preferred level. Both the coarse and fine adjustments can be combined and reflected in the resulting signal on line 112.

Figure 2:
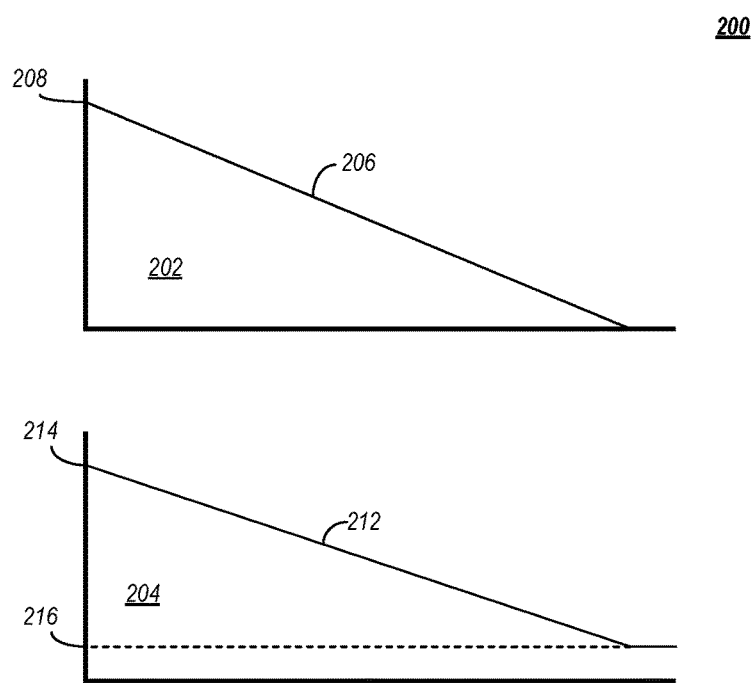
FIG. 2 is graph chart diagram showing current output of a constant current driver and a dimming signal for controlling the output current level of the constant current driver, in accordance with some embodiments.

FIG. 2 is graph chart diagram 200 showing current output of a constant current driver and a dimming signal for controlling the output current level of the constant current driver (e.g. 102 of FIG. 1), in accordance with some embodiments. Specifically, the graph 204 of the dimming signal shows the value 206 (e.g. voltage, duty cycle, etc.) decreasing. The decrease is mathematical, not necessarily over time or some other parameter, but rather only to illustrate the effect on the constant current power supply as the value is varied from a relative high level 208 to a low level (e.g. zero) going from left to right. The dimming signal value 206 can be provided to the constant current power supply by an external source, such as an LED lamp, in accordance with some embodiments. In response, the output current level 212 varies in response from a maximum current level 214 (on the vertical axis) to some minimum current level 216 in correspondence with the value 206 of the dimming signal. The minimum current level 216 is shown here as being non-zero, but could be zero depending on how the constant current driver is designed. Furthermore, the current level 212 is shown as being linearly proportional, which may or may not be the case in actual implementation. The charts 202, 204 only server to illustrate that the output current level 212 can be adjusted with a dimming signal value 206 provided in the inventive arrangement by an LED lamp to the externally located constant current driver that provides current and voltage to the LED lamp.

Figure 3:
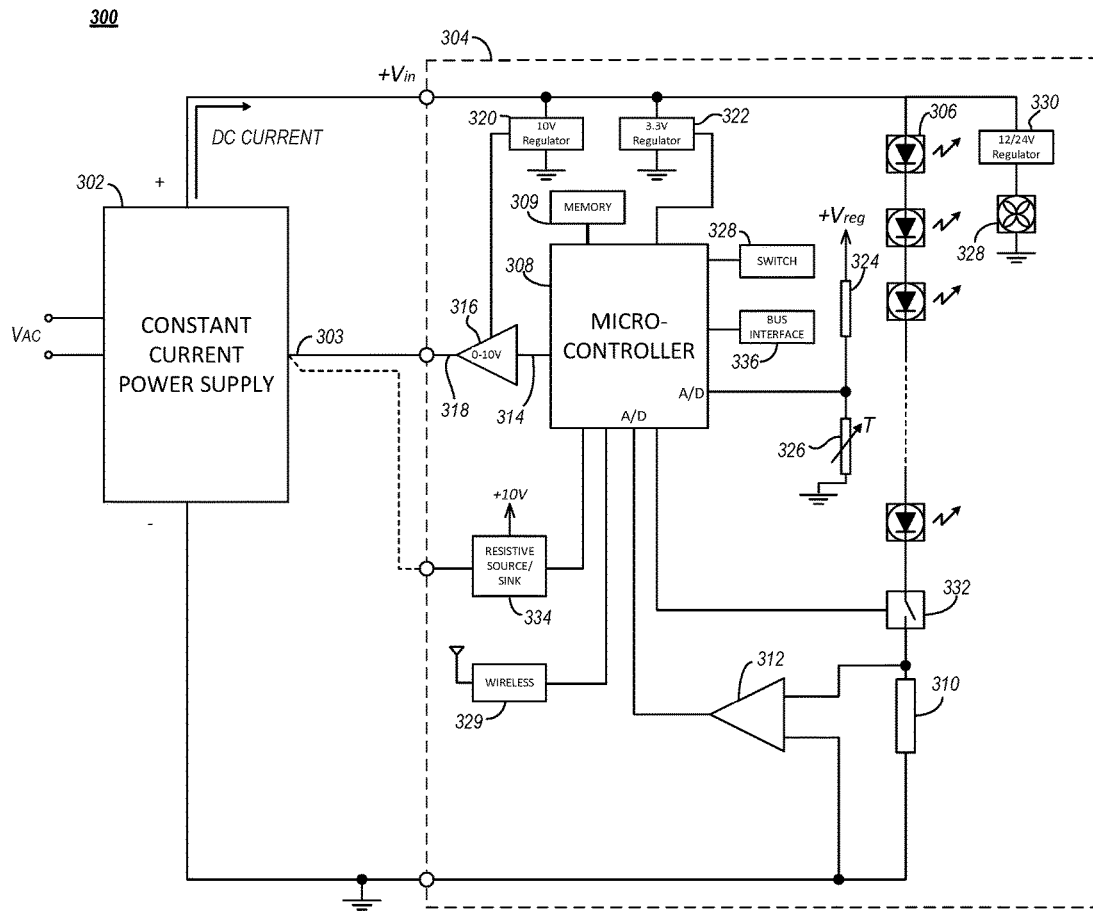
FIG. 3 is a schematic diagram of an LED lamp that can regulate the output of an external constant current driver providing a DC current to the LED lamp for a desired light output level, in accordance with some embodiments.

FIG. 3 is a schematic block diagram of a light emitting diode (LED) lighting system 300, in accordance with some embodiments. The system 300 includes a constant current driver or power supply 302 that provides a constant direct current (DC) to an LED light lamp 304 that may be housed or supported in a lighting fixture. The constant current power supply 302 is powered by a commercial alternating current (AC) source (e.g. 110/220 $V_{AC}$). The constant current power supply 302 outputs a steady state DC current that can be varied by a signal provided to a dimmer control input 303. The dimmer control input 303 is an input for a dimmer control where a voltage or other signal applied to the dimmer control input 303 causes the constant current power supply 302 to adjust its DC output current. The output current of the constant current power supply 302 can be varied proportionally or substantially proportionally with the level of the signal provided at the dimmer control input, within a given range. In some lighting power supplies, it is known to use a range of 0-10 volts for a dimming signal, where 10 volts at the dimmer control input 303 causes the constant current power supply 302 to output its rated (i.e. maximum) current, and reducing the voltage at the dimmer control input 303 causes the constant current power supply 302 to reduce its output current accordingly, down to some minimum current, if not zero current. In some embodiments the relationship between output current of the constant current power supply 302 and the signal value at the dimmer control input 303 can be inversely proportional. The signal value can be a DC voltage level, the duty cycle of a PWM signal, or any other electric, optical, or electromagnetic signal level.

The LED light lamp 304 includes at least one series-connected string of LEDs 306, through which the current provided by the constant current power supply 302 flows during operation. The LED lamp 304 also includes a microcontroller or microprocessor 308 that determines the appropriate level of the dimming signal 318 to reflect the coarse and fine adjustments to have the light output of the LEDs 306 at the desired level. The LED lamp 304 can further include a current sense amplifier 312 that amplifies voltage produced by the current flowing through a current sense resistor 310 that is connected in series with the LEDs 306 and provide a current sense signal to the controller 308. The microcontroller 308 provides an output control signal 314 that can be converted to a dimmer signal 318 that ranges from 0-10 volts (DC) via an amplifier 316. In other embodiments dimmer signal can be a PWM signal having a variable duty cycle, or another form of signal that can be utilized by the constant current power supply 302 to adjust its output current.

Alternatively, the LED lamp 304 can include a dimming controller 334 that is a resistive source or a resistive sink, similar to the dimmer controllers typically mounted in walls near light switches. The dimming controller 334 can coupled to dimming input 303 of the constant current driver 302 and simulates a resistive load that either sources or sinks current/voltage, and which is adjustable by the microcontroller 308. In a source mode the dimming controller 334 provides a variable voltage (e.g. on the order of 0-10 volts) as an output to the dimming input 303 of the constant current driver 302, and in a sink mode the dimming controller 334 acts as a variable resistor that is loaded by the constant current driver 302, meaning the constant current driver 302 provides a voltage through a resistance that is internal to the constant current driver 302, and which is divided by the dimming controller 334, as adjusted by the microcontroller 308. To vary the signal level at the dimming input 303.

The microcontroller adjusts the output current of the constant current power supply 302 via the output control signal 314 and dimming signal 318, or by setting the dimming controller 334 to an appropriate setting, in response to several various inputs, including a temperature input and which can further include a user adjustment input. The temperature input can be derived by sensing the voltage across a thermistor 326 which is coupled in series with a voltage divider resistor 324 to which a regulated and constant voltage ($+V_{reg}$) is applied. The voltage across the thermistor 326 indicates a temperature of the LEDs 306, assuming the thermistor 326 is in sufficient thermal proximity to the LEDs 306. The current sense circuit 310, 312 can be used in a control loop to ensure that the constant current power supply 302 output the required level of current to achieve the desired light output level.

A user input can be received from one or more adjustment sources like a switch 328. Other adjustment sources can include, for example, a wireless transceiver 329 that receives a wireless control signal to set a light output level, and which can transmit acknowledgements and other information to a remote wireless device. The wireless transceiver 329 can be, for example, a WiFi or BlueTooth transceiver. Still further adjustment sources can include a dimmer adjustment to adjust the light output level, and a schedule input that sets a light output schedule (where light output level is varied during the day, and based on the time of day), among others.

Furthermore, the microcontroller 308 can add offsets (e.g. fine adjustment) to desired light output levels based on temperature and life of the LEDs 306. As the LEDs heat, they require less current, but as the LEDs age, they require more current to produce a given light output level. The microcontroller 108 combines the various inputs to decide on a current that will produce the desired light output and produces the output control signal 314 at a corresponding level. As a result the constant current power supply 302 adjust the amount of current it outputs. The LED lamp 304 further includes voltage regulators such as a 10 volt regulator 320 and a 3.3 volt regulator 322 to provide voltage to operate the microcontroller 308.

The fine and coarse adjustments can be used to ensure that the light output of each LED lamp in a system including a plurality of LED lamps is consistent from lamp to lamp given the same settings, no matter the age or temperature differences among the lamps. So, for example, given a system with several LED lamps of varying ages, and operating at different temperatures due to differences in climate control in the space being illuminated by the LED lamps, and where the LED lamps are configured to follow a light output schedule, changing their light output level from a maximum light output level during the day to an 80% of maximum light output level at night, with each LED lamp configured to adjust its individual light output level by controlling the output current of its respective constant current power supply, each LED lamp can output substantially the same light output level during operation, regardless of differences in temperature, age, coarse adjustment for light output level (e.g. changing light output level when going from day to night). This prevent some LED lamps from appearing brighter or darker than others regardless of differences in age and temperature.

A memory 309, that is coupled to the microcontroller 308, can contain data and instruction code for carrying out the operations of determining an adjustment level and controlling the adjustment signal 314 in response to adjustment inputs, including, for example, temperature, age, schedule, fixed settings, and received adjustments. More specifically, the memory 309 can contain data that characterizes the thermal characteristics of the LEDs 306 related in a table to the current needed for a given nominal light output level. The memory can further be used to maintain an age parameter, indicating an age of the LEDs, along with a table indicating what adjustment in current from an original value is needed at a given LED age to achieve the same light output. The clock (not shown) used to maintain the age parameter can also be used to track the time of day. The lamp 304 can be programmed, such as via the wireless transceiver 329 or via switches with a schedule of operation, indicating times of operation and corresponding light output levels for those times.

For thermal improvement a fan 328 can be used to cool the LEDs 306. The fan can be powered by a voltage regulated from the voltage $+V_{in}$ provided to the LED lamp 304 by the constant current power supply 302, and a 12V/24V regulator 330 can be used to power the fan at 12 or 24 volts. The fan can also be 120 Vac input.

The switch 328 can be a dual in-line package (DIP) switch array that can be used to set a digital value as an input to the microcontroller 308 to indicate a desired light output level, or a mode of operation. For example, the switch settings can indicate whether dimming controller is to be performed via, for example, the output of amplifier 316, or dimming controller 334. In some embodiments, the wireless transceiver 329 can be interfaced to a wireless dimming controller that is external to the LED lamp 304 and coupled to the constant current driver 302 in order to control the electric current output of the constant current driver 302. The switch settings of switch 328 can further indicate modes of operation (e.g. maximum light output), a lighting schedule (e.g. when to turn on and at what lighting level).

In order to control the on/off operation of the LED lamp 304, a switch 332 can be provided in series with the LEDs 306 that is controlled by the microcontroller 308. The switch 332 can be used to open or close the circuit path for current through the LEDs 306 to, for example, implement a lighting schedule and control when the LED lamp 304 is to produce light or not produce light. When the switch 332 is open, the constant current driver 302 will still be providing power to the LED lamp 304, allowing the microcontroller 308 and other circuitry to continue operating.

During operation the microcontroller can record information in memory 309, such as temperature history (e.g. as indicated by the voltage across thermistor 326), input events, switch 328 settings, and so on. Likewise information regarding failures can be recorded for later diagnostic evaluation. For example, if any of the LEDs 306 burn out and stop conducting (i.e. open circuit), then the lack of current can be sensed using current sense resistor 310 and amplifier 312. The time of occurrence of the failure can be recorded using a clock maintained by the microcontroller 308. Furthermore, upon a failure occurring, the wireless transmitter 329 can be used to transmit a failure message to a supervising entity as programmed into the memory. The operating history information stored by the microcontroller 308 in the memory 309 can be accessed either via the wireless transceiver 329, or a bus interface 336 (e.g. a universal serial bus).

Figure 4:
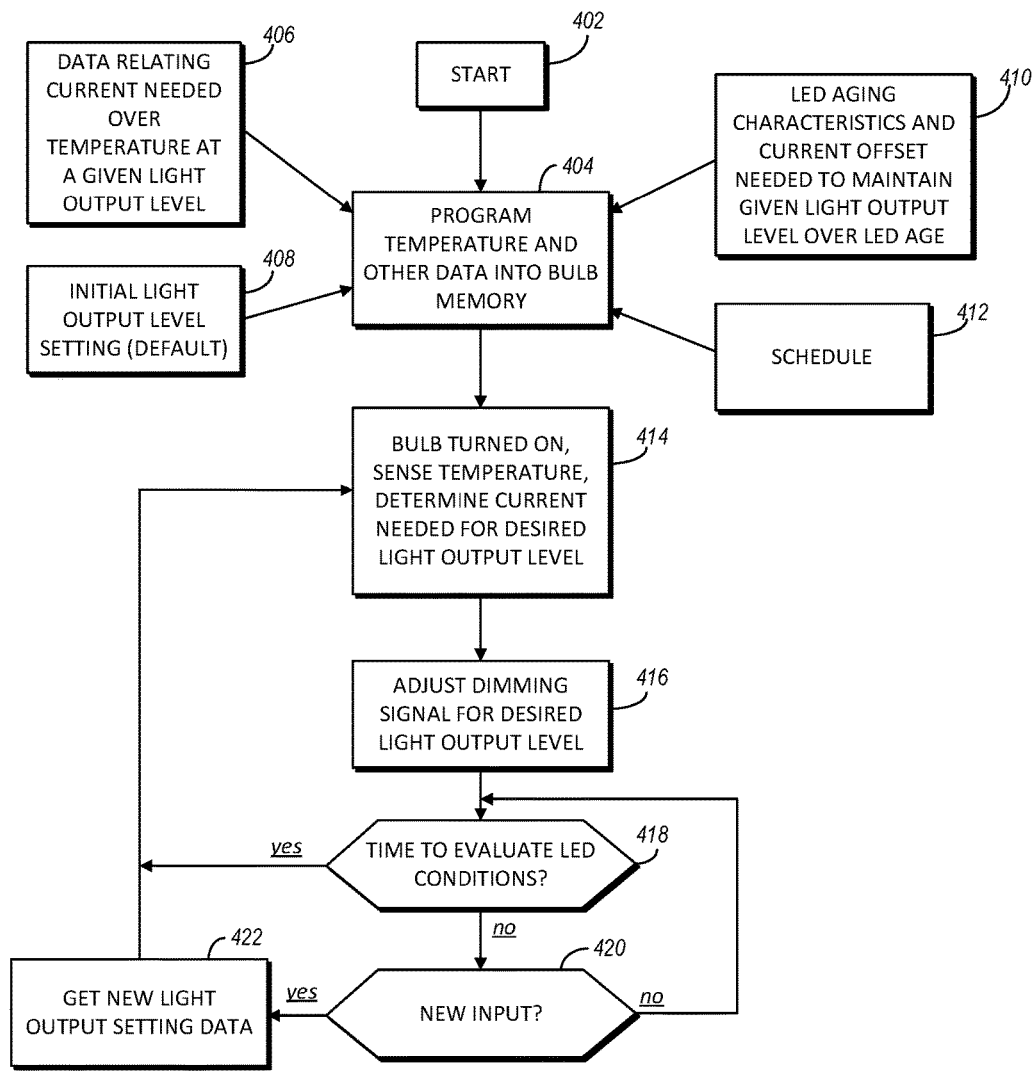
FIG. 4 is a flow chart diagram of a method of operating a LED lamp, in accordance with some embodiments.

FIG. 4 is a flowchart diagram 400 of a method of operating a LED lamp, in accordance with some embodiments. At the start 402, the LED lamp is manufactured, and the LED lamp may be tested to determine its light output level at particular test currents and temperatures. The test data can be used in a table form or other similar data structure to allow interpolation between values so that a desired light output level can be achieved at a given LED temperature. In step 404 data can be programmed into the LED lamp's memory for use by the microcontroller. Data includes temperature data 406 that relates light output level to current over temperature of the LEDs, which can be determined for each LED lamp, or for particular LEDs used in the manufacture of the LED lamp. Data indicating an initial light output level setting 408 can be further programmed into the LED lamp memory which indicates the desired light output level (e.g. as a percentage or other value relative to a maximum value). Data relating the current adjustment needed over the age of the LEDs (410) used in the manufacture of the LED lamp to maintain a consistent light output level as the LED lamp ages can be programmed into the LED lamp memory for use as a fine adjustment over the life of the LED lamp. Schedule data 412 can be used to indicate a daily schedule for light output level can be further programmed into the LED lamp memory.

In step 414 the LED lamp can commence operation by sensing the current LED temperature, and determine the current needed for the desired light output as indicated by programmed parameters or a default, or based on a schedule. In step 416 the controller of the LED lamp outputs a dimming signal to the constant current power supply that provides the current to the LED lamp (and is external to the LED lamp), and adjust the dimming signal for the appropriate current needed for the desired light output level. This can be a control loop process where the LED lamp monitors the current and adjusts the dimming signal until the current is at the required level, or the dimming signal can indicate to the constant current power supply the required current level, where the dimming signal is a digital value or other indication of a particular current value.

Upon performing step 416, the LED lamp will be outputting the desired light level (e.g. in lumens or other light parameter). At step 418 the method determines whether it is time to reevaluate the LED conditions in the lamp. This step can be performed at regular intervals. If enough time has passed, then the method returns to step 414, otherwise the method can, in step 420, determine if any new input has been received (e.g. from switch settings of via the wireless transceiver). If new settings have been received, then in step 422 the new setting for light output level, new schedule, or other new setting is obtained and saved in the LED lamp memory, and the method uses the new setting information to repeat step 414. When, in step 420, there is no new input, the method simply returns to step 418.

Figure 5:
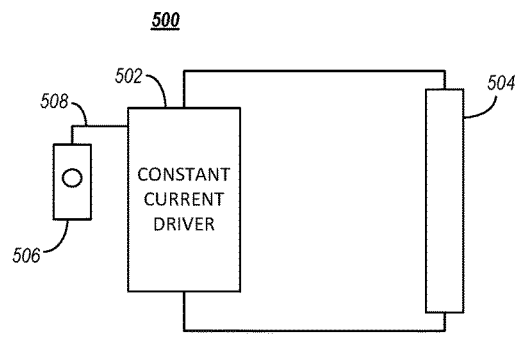
FIG. 5 is a prior art block diagram schematic of a lighting system.

FIG. 5 is a block diagram schematic of a prior art lighting system 500 including a wall-mounted conventional dimmer control 506. A constant current power supply or driver 502 provides a current to an LED lamp 504 at a preselected level. The level of the current can be varied by adjusting the dimmer control 506, which changes a dimming control signal 508 that is provided to the constant current driver 502. As the dimming control signal is varied by adjusting the dimmer control 506, the current output by the constant current driver 502 varies, and therefore the light output of the LED lamp varies. However, this arrangement prevents the LED bulb 504 from controlling the output current level of the constant current driver 502.

Figure 6:
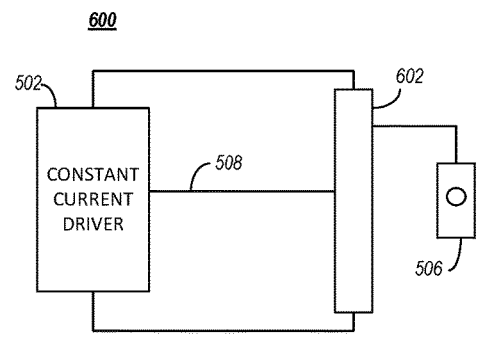
FIG. 6 is a block diagram schematic of one arrangement of a lighting system for controlling light output, in accordance with some embodiments.

FIG. 6 is a block diagram schematic of one arrangement 600 of a lighting system for controlling light output, in accordance with some embodiments. In arrangements 600 and 700 the LED lamp 602 provides an output signal 508, as a control signal or dimming signal, to the constant current driver 502. The LED bulb 602 can be designed substantially as shown in FIG. 3. A dimmer control 506 can then be wired or coupled to the LED lamp 602 to receive a signal from the dimmer control 506 indicating a coarse light output level desired by a user in the vicinity of the LED lamp 602. As the dimmer control 506 is adjusted, the LED lamp 602 can adjust the signal 508 in correspondence, giving the user control over the light output level of the LED lamp. Once the user has adjusted the light output level to the desired level, then the LED lamp 602 can make fine adjustments to signal 508 as, for example, the temperature of the LEDs changes, to keep the light output constant as the temperature of the LEDs varies. Accordingly, the disclosure provides an LED lamp that can be controlled by an external dimmer controller, and which can in turn adjust the current output of a constant current driver while making further adjustments to the light output level in view of other parameters include the temperature of the LEDs of the LED lamp, a light output schedule, a life/aging adjustment, and so on. Various other adjustment sources can be applied without departing from the scope of the disclosure, as will be appreciated by those skilled in the art.

Figure 7:
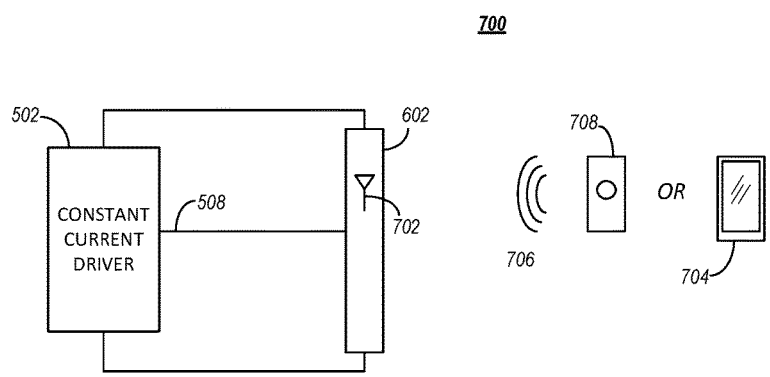
FIG. 7 is a block diagram schematic of one arrangement of a lighting system for controlling light output, in accordance with some embodiments.

FIG. 7 is a block diagram schematic of one arrangement 700 of a lighting system for controlling light output, in accordance with some embodiments. The arrangement 700 is similar to arrangement 600 of FIG. 6, with the difference being that the dimming controller 708 is a wireless device. Alternatively, the dimming control can be performed by an application program executing on a computing device such as a mobile phone device 704. A wireless dimming control signal 706 (e.g. BlueTooth, WiFi) can be received at the wireless transceiver of the LED lamp 602 via an antenna 702. The operation of controlling the output current of the constant current driver 502 is then substantially similar to that of arrangement 600 of FIG. 6.

Figure 8:
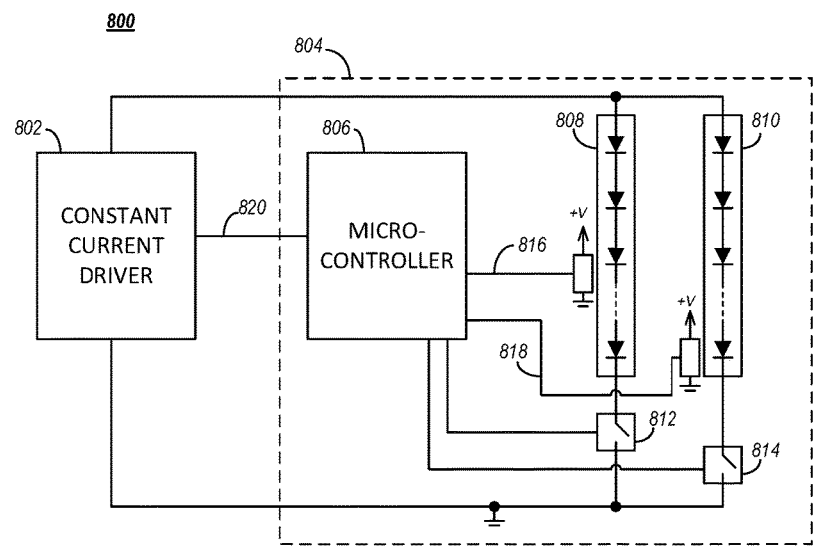
FIG. 8 is a block schematic diagram of a lighting system utilizing a LED lamp having parallel LED circuits, in accordance with some embodiments.

FIG. 8 is a block schematic diagram of a lighting system 800 utilizing a LED lamp having parallel LED circuits, in accordance with some embodiments. A constant current driver 802 provides DC current and voltage to a LED lamp 804 including a plurality of series connected strings or clusters of LEDs 808, 810. The LED lamp 804 can be substantially similar to that shown in FIG. 3 with the addition of one or more parallel LED strings (e.g. 810). The constant current driver 802 is response to an input signal on line 820 provided from the LED lamp 804 under control of a microcontroller 806 or similar logic circuit. The microcontroller 806 receives input such as, for example, temperature signals 816, 818 from respective thermal sensing circuity for LED strings 808, 810 to monitor the temperature of each LED string 808, 810. Furthermore, each string 808, 810 includes a series switch and current sense circuit 812, 814, respectively.

In this arrangement the current output by the constant current driver 802 is shared between the two LED strings 808, 810. The microcontroller 806 can sense the current through each string 808, 810, determine a total current, and adjust the current output of the constant current driver 802 via the signal level on line 820. In the event that a failure occurs in one of the LED strings 808, 810, then all of the current will flow through the remaining LED string. The change in current flow can be detected by the microcontroller 806 via the switch and current sense circuits 812, 814. To avoid excess current flowing through the operating LED string, the microcontroller 802 can adjust the output current of the constant current driver 802 via the signal on line 820, causing the constant current driver 802 to reduce its output current so that the current flowing through the remaining LED string is at an appropriate level.

Additionally, the microcontroller can shut off one of the LED strings 808, 810 to reduce light output based on a user input, or a lighting schedule. When one of the LED strings is shut off (e.g. by opening a switch in switch and current sense circuits 812, 814), the microcontroller can control the output current of the constant current driver to a desired level for a desired light output level of the LED strings that are operating. In order to ensure even aging of the LED strings 808, 810, when one or more LED strings are to be deactivated, the microcontroller and rotate which LED string(s) get turned off, even keeping track of the time each string is on, and change which LED strings get turned on/off over time to even out the operation time among the LED strings 808, 810.

Figure 9:
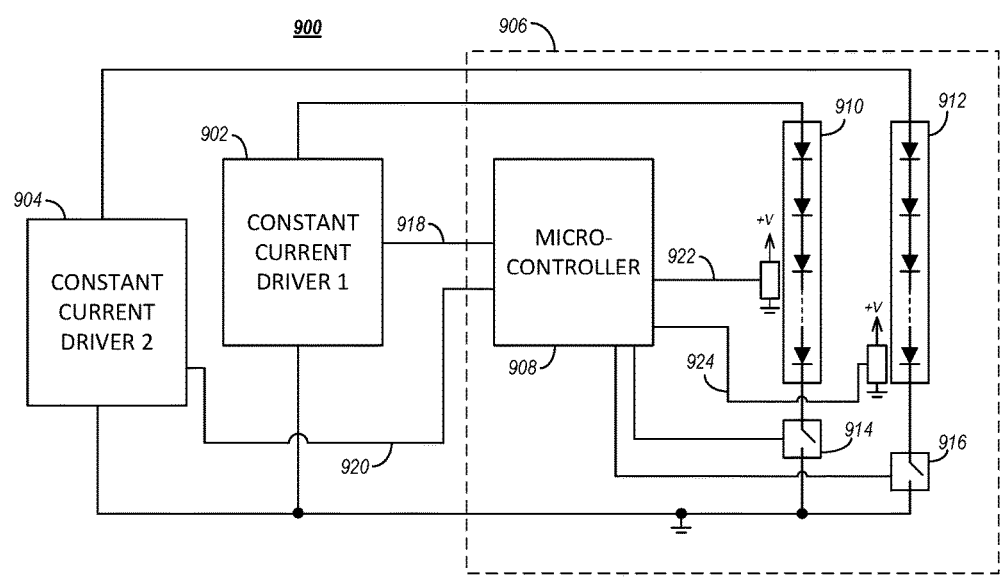
FIG. 9 is a block schematic diagram of a lighting system utilizing a LED lamp having parallel LED circuits, in accordance with some embodiments.

FIG. 9 is a block schematic diagram of a lighting system 900 utilizing a LED lamp having parallel LED circuits, in accordance with some embodiments. Similar to the system 800 of FIG. 8, the LED bulb 906 includes two (or more) LED strings 910, 912 (which can be physically arranged in any configuration, e.g. a cluster, line, etc.) of series-connected LEDs. However, each string 910, 912 has its own current path, and are provided current by separate constant current drivers 902, 904 (or separate outputs of a constant current driver). Each constant current output is individually controlled by the microcontroller 908 via lines 918, 920, and the signal level on lines 918, 920 are adjusted based on input to the microcontroller 908, which can include temperature information for each LED string 910, 912 on lines 922, 924, and current sensing information from current sense and switch circuits 914, 916. In this system 900 either LED string 910, 912 can be shut off or turned on without disturbing the current through the other LED string, and the light output level of the LED lamp 906 can be varied by turning on or off either or both of the LED strings, and separately controlling the current though each string in view of inputs such as the separate temperature signals 922, 924. In some embodiments, a single temperature sensing circuit can be placed between the LED strings 910, 912 to indicate the temperature of the LEDs of both or either LED string 910, 912.

Accordingly, the disclosed LED lamp and lighting system avoids the problems associated with the prior art. By using a current regulated power supply rather that a voltage regulated power supply, there is no overhead voltage needed to ensure the LED lamp is operational and that sufficient forward voltage will be applied across every LED in the plurality of LEDs. This avoids the problems associated with sorting LEDs by forward voltage and allows operation based on current, which is much better at controlling the light output of an LED. Furthermore, by adjusting the current with temperature, the light output level can be kept consistent during operation from the time the LED lamp is first turned off and relatively cool through the rise in temperature to a steady operating temperature. Furthermore, by adjusting current in the manner disclosed, groups of LED lamps can all maintain the same light output level while operating so that no LED lamp appears brighter or darker than any other LED lamp in the group.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A method for operating a light emitting diode (LED) lamp, comprising:
providing a plurality of LEDs connected in series between a positive terminal and a negative terminal, and which provide a light output level based on a direct current through the plurality of LEDs;
receiving an input signal at a controller of the LED lamp;
providing, by the controller, an output signal to a constant current driver that is independent of the LED lamp and which provides current to the LED lamp to power the plurality of LEDs to a light output level corresponding to the input signal, wherein the output signal is based at least in part on the input signal; and
amplifying by an amplifier coupled to an analog output of the controller, which is operable to produce a current control signal over a range of 0-10 volts.

2. The method of claim 1, wherein receiving the input signal comprises receiving the input signal from a temperature sensing element in the LED lamp that senses a temperature of the plurality of LEDs, and wherein the output signal is adjusted to maintain the light output level of the plurality of LEDs at a consistent level over temperature.

3. The method of claim 1, wherein receiving the input signal comprises receiving the input signal from a wireless transceiver of the LED lamp indicating a wireless dimmer setting desired for the light output of the plurality of LEDs.

4. The method of claim 1, wherein providing the output signal is further based on an age of the LED lamp, where the controller adjusts the output signal to augment the current provided by the constant current LED driver with the age of the LED lamp.

5. The method of claim 1, wherein receiving the input signal comprises receiving the input signal from a switch setting of a selector switch of the LED lamp that indicates a desired light output of the plurality of LEDs.

6. The method of claim 1, wherein providing the output signal comprises providing a DC voltage in the range of 0-10 volts.

7. The method of claim 1, wherein providing the output signal comprises providing a pulse width modulated signal with a variable duty cycle.

8. A light emitting diode (LED) lamp that self regulates its light output to ensure a consistent light output level while operating, comprising:
a plurality of LEDs connected electrically in series operable to produce a light output level that is dependent on a level of current through the plurality of LEDs;
an input signal source providing an input signal corresponding to one of a user input or a condition of the LED lamp;
a controller operable to receive the input signal and output a current control signal to a constant current driver that is external to the LED lamp and which provides the level of current to the LED lamp based in part on a level of the current control signal, and wherein the controller is further operable to vary the level of the current control signal based on the input signal to maintain the light output level; and
an amplifier coupled to an analog output of the controller and which is operable to produce the current control signal over a range of 0-10 volts.

9. The LED lamp of claim 8, wherein the input signal source is a temperature sensing circuit and the input signal corresponds to a temperature of the plurality of LEDs, the controller is further operable to vary the current control signal to maintain the light output level of the plurality of LEDs constant as the temperature of the plurality of LEDs changes.

10. The LED lamp of claim 8, further comprising a wireless transceiver operable to receive a wireless dimming signal and provide a dimming setting signal to the controller, and wherein the controller is further operable to adjust the current control signal based on the dimming setting signal.

11. The LED lamp of claim 8, further comprising a light output selection switch operable to output, to the controller, a selection signal that corresponds to one of a plurality of light output levels, and wherein the controller is further operable to adjust the current control signal based on the selection signal.

12. The LED lamp of claim 8, wherein the controller is further operable to adjust the current control signal based on an age of the plurality of LEDs to maintain the light output level of the plurality of LEDs at a consistent level as the plurality of LEDs age over time.

13. The LED lamp of claim 8, wherein the thermal sensing circuit comprises a thermistor in series with a fixed resistor, and wherein the temperature signal is produced at a junction of the thermistor and the fixed resistor.

14. The LED lamp of claim 8, further comprising a current sensing circuit operable to sense the level of current through the plurality of LEDs and provide a current sense signal to the controller, and wherein the controller is further operable to adjust the current control signal based on the current sense signal.

15. A light emitting diode (LED) lamp, comprising:
a plurality of LEDs connected in at least one series string;
a temperature sensing circuit that produced a temperature signal that corresponds to a temperature of the plurality of the LEDs;
a current sense circuit that provides a current signal which corresponds to current through the at least one series string of LEDs;
at least one user adjustment circuit that provides an adjustment signal corresponding to a user preference for light output level of the plurality of LEDs;
a controller that receives the temperature signal, current signal, and adjustment signal, and based on the temperature signal, current signal, and adjustment signal produces an output control signal which corresponds to a current level, the output control signal controls an output current level of a constant current power supply that is external to the LED lamp and that provides the current to the LED lamp which passes through the at least one series string of the LEDs; and
an amplifier coupled to an analog output of the controller and which is operable to produce the current control signal over a range of 0-10 volts.

16. The LED lamp of claim 15, wherein the adjustment signal is further based on an age of the LED lamp.

17. The LED lamp of claim 15, further including a wireless transceiver via which the LED lamp receives a dimming setting, the adjustment signal is further based on the received dimming setting.

18. The LED lamp of claim 15, wherein the adjustment signal is a dimming signal having an operating range of 0-10 volts.

19. The LED lamp of claim 15, wherein the adjustment signal is a pulse width modulated signal having a variable duty cycle, and wherein the duty cycle controls the output current of the constant current power supply.

20. The LED lamp of claim 15, wherein the temperature sensing circuit comprises a thermistor in series with a fixed resistor, and wherein the temperature signal is produced at a junction of the thermistor and the fixed resistor.

* * * * *